Figure 1:
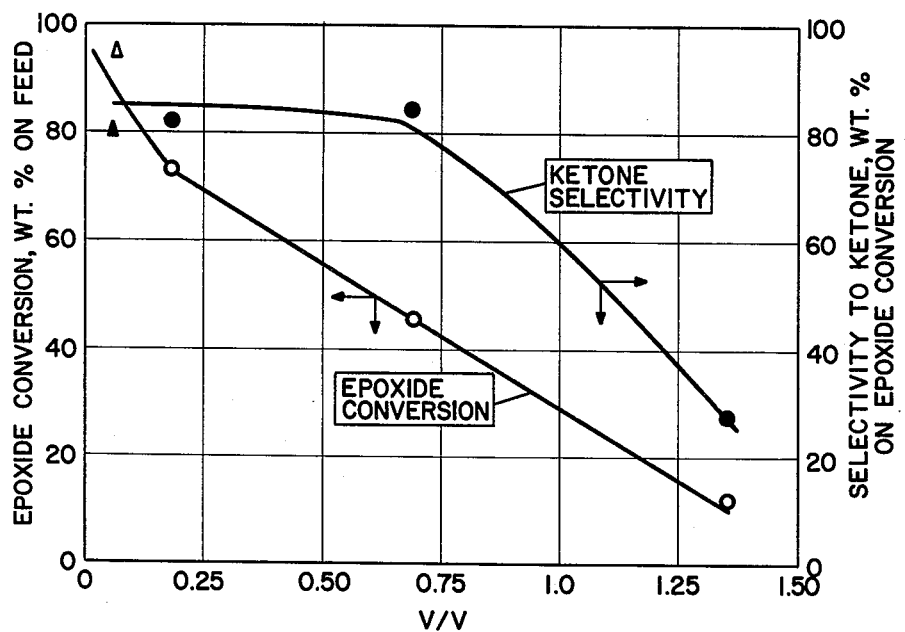

Carl E. Heath
Robert M. Skomoroski   Inventors
Robert B. Long

By Seymour Stahl Attorney

United States Patent Office 3,009,959
Patented Nov. 21, 1961

3,009,959
PRODUCTION OF HIGHER KETONES FROM SATURATED EPOXIDES
Carl E. Heath, Nixon, Robert M. Skomoroski, Elizabeth, and Robert B. Long, Wanamassa, N.J., assignors to Esso Research and Engineering Company, a corporation of Delaware
Filed Nov. 6, 1958, Ser. No. 772,386
9 Claims. (Cl. 260—593)

The present invention relates to the preparation of ketones by the catalytic re-arrangement of certain cyclic ethers or epoxides. More particularly, it relates to the optimum production of ketones containing four or more carbon atoms by the isomerization of cyclic ethers containing at least four carbon atoms in the presence of a copper on activated carbon catalyst support and hydrogen under optimum conditions of temperature and pressure. Most particularly, it relates to decreasing the rapid deactivation of the copper on activated carbon catalyst encountered in conventional non hydrogen operations by utilizing hydrogen and by operating at pressures (hydrogen plus feed as vapor) of 150–350 p.s.i.g.

Various ketones such as methyl n-propyl ketone, methyl n-butyl ketone, ethyl n-propyl ketone, cyclohexanone and the like have been increasing in use as chemical intermediates and industrial solvents. Methyl propyl ketone in particular is of importance as a dewaxing solvent for high boiling petroleum fractions such as those boiling in the lubricating oil range. Methyl butyl and ethyl propyl ketones are medium and high boiling solvents for synthetic resins, gums, waxes, nitrocellulose, ethyl cellulose, fats and oils which find application in the manufacture of lacquers and other surface coatings. Cyclohexanone is employed as a solvent and intermediate in the preparation of certain synthetic fibers. To date the supply of such ketones at economical prices has been rather limited and this has prevented their widespread use.

It is the main object of this invention to provide a simple, effective, yet economical process for preparing various higher molecular weight ketones. A more specific object is to provide a process for making such ketones as the major products in the isomerization of certain cyclic ethers or epoxides.

Basically, the present invention involves passing a saturated epoxide such as 2-methyl tetrahydrofuran, 2,5-dimethyl tetrahydrofuran (also known as 2,5-epoxyhexane), 3,4-epoxyhexane, 1,2-epoxycyclohexane, and the like at an elevated temperature and under moderate pressure over a catalyst capable of causing isomerization of the cyclic ether without causing extensive dehydration or decomposition of the feed or product ketone.

The cyclic ethers or epoxides employed as feeds to this process must have the oxygen linked to at least one secondary carbon atom and contain at least 5 and up to 16 carbon atoms per molecule. As an exception to the foregoing generalization, the 4 carbon atom, 2,3-epoxybutane is also operative. However, epoxides containing from 5 to not more than 10 carbon atoms are particularly preferred since more extensive substitution, especially where branched alkyl substituents are involved, may appreciably hinder the reaction due to steric effects. The useful epoxides may be represented by the structural formula

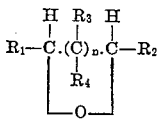

wherein the number of carbon atoms totals from 5 to 16, preferably 5 to 10; $R_1$ is an alkyl group of 1 to 4 carbon atoms; $R_2$ is also preferably an alkyl group of 1 to 4 carbon atoms, but alternatively may be a hydrogen atom; or $R_1$ and $R_2$ are joined together forming a single polymethylene bridge of 3 or 4 carbon atoms; $R_3$ and $R_4$ are hydrogen atoms or alkyl groups of 1 to 4 carbon atoms; and $n$ is an integer ranging from 0 to 3 so that the epoxide nucleus is either an ethylene oxide, propylene oxide, tetramethylene oxide, tetrahydrofuran or tetrahydropyran, preferably one of the latter two. When $R_1$ and $R_2$ are tied together in a polymethylene bridge they form a naphthene ring as in 1,2-epoxycyclohexane having the formula

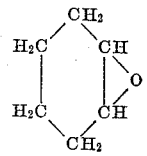

Epoxides suitable for the purposes of this invention are obtained in good yields from the vapor phase non-catalytic oxidation of certain hydrocarbons. A convenient process for carrying out such oxidations is described, for example, in U.S. Patent 2,725,344 to M. R. Fenske and J. H. Jones. For instance, normal pentane can be oxidized to 2-methyl tetrahydrofuran and 2,4-epoxypentane; cyclohexane gives 1,2-epoxycyclohexane and some 1,4-epoxycyclohexane; normal heptane gives a mixture of 2-methyl-5-ethyl tetrahydrofuran, 2-propyl tetrahydrofuran, 2,4-epoxy-heptane and 3,4-epoxy-heptane; and normal hexane gives 2,5-dimethyl tetrahydrofuran, 2,4-epoxyhexane and 3,4-epoxyhexane. Suitable epoxides are also obtainable by hydrogenation of the corresponding furan derivatives which in turn can be obtained by the chemical conversion of certain agricultural products. Thus, 2,5-dimethyl tetrahydrofuran is readily formed by hydrogenation of 2,5-dimethylfuran. Epoxides can also be obtained from olefins via chlorohydrin or oxidation reactions.

Other examples of useful compounds include 2-propyl tetrahydrofuran, 2,3,4,5-tetramethyl tetrahydrofuran, 2-propyl-5-n-butyl tetrahydrofuran, 2,3,4-tripropyl tetrahydrofuran, 2-methyl tetrahydropyran, 2,6-diethyl tetrahydropyran, 2-methyl-3,4,6-tripropyl tetrahydropyran, 1,3-epoxypentane, 1,2-epoxypentane, 2,3-epoxyhexane and so forth. Epoxides having less than five carbon atoms do not give ketones, with the exception of 2,3-epoxybutane which can be converted to 2-butanone with the aid of the present invention. On the other hand, 1,2-epoxybutane and 1,4-epoxybutane (tetrahydrofuran) tend to produce an aldehyde rather than a ketone.

The catalysts of this invention are prepared by impregnating activated carbon having a surface area of about 100–1500 m.²/g. with an aqueous solution of a copper salt usually the chloride or the nitrate. Sufficient aqueous solution is used to completely wet the carbon base. The resulting base can then be dried at room temperature and finally at a temperature up to 150° C. in an inert atmosphere. It is finally reduced with hydrogen at a temperature of about 400–500° C. prior to use in order to deposit the catalytic metal on the base.

The preferred catalysts of the present invention are those free of residual acids on the catalyst. These residual acids can hydrolize epoxides to glycols, promote olefin formation and promote the formation of polymers. All of these are, of course, undesirable. The polymers for example are laid down on the catalyst surface, thus decreasing catalyst activity. These acid free catalysts may be prepared by controlling the calcining procedure or by neutralizing the catalyst with a base prior to use. According to the first method the impregnated catalyst is heated in a vacuum for about 4–6 hours at 430° C. before the final step of reducing with hydrogen. Thus, heating in a vacuum helps to decompose all of the copper nitrate and thereby results in an acid free catalyst. According to the latter neutralization method, after the catalyst has been reduced in a hydrogen atmosphere, it is washed in a dilute solution of ammonium hydroxide (10-25%) to neutralize any acids left on the catalyst surface. It is also contemplated that any polymers still laid down on the catalyst may be removed by additionally washing the catalyst during the process with a dilute basic solution if desired.

Copper concentrations on the carbon base between 0.01 to 20 wt. percent are employed in this invention. Concentrations in the range of 1.0-10% are preferred, the level depending on the reaction conditions. Such catalysts can be employed in a fixed bed or fluid solids type reactor.

Reactor temperatures may range between about 200 and 500° C., depending to some extent on the nature of the epoxide feed, the space velocity, and the particular catalyst used. In general, for each epoxide there is a readily determinable optimum isomerization temperature, above which the yield of desired carbonyl compounds drops off rather rapidly. Below 250° C., low conversions are obtained and for this reason temperatures in the range of about 300 to 430° C. are preferred. Epoxides of cyclic paraffins tend to require somewhat lower temperatures than epoxides of straight chain paraffin of the same molecular weight.

According to the present invention the activity of the copper on activated carbon catalyst used in this isomerization of epoxides to ketones is maintained at a high level by operating with hydrogen under an optimum pressure (hydrogen plus feed as vapor) of 150-350 p.s.i.g. preferably 200-300 p.s.i.g. If the pressure is greater than the above 350 p.s.i.g., appreciable hydrogenation occurs resulting in the production of undesirable water and alcohols and reducing yields. If the pressure is less than 200 p.s.i.g., then the catalyst quickly loses its activity.

Typical operating conditions for obtaining high conversion and selectivity in the present isomerization process are as follows:

|  | Broad Range | Preferred Range |
| --- | --- | --- |
| (hydrogen+feed as vapor) p.s.i.g | 150-350 | 200-300 |
| Temperature, ° F | 400-900 | 600-750 |
| Space Velocity, v./hr./v | 0.10-2.5 | 0.10-1.2 |
| Catalyst, percent Cu on activated carbon | 4-8 | 5-6 |
| Hydrogen/epoxide, Mol. Ratio | 0.5-6.0 | 1-2 |

The invention will be better understood from a consideration of the following specific examples. Unless otherwise indicated all percentages and proportions of materials are expressed throughout on a weight basis.

*Example 1*

The data reported in the table below on the isomerization of 2,5-dimethyltetrahydrofuran to 2-hexanone were obtained under the following conditions: Temperature 750° F., Hydrocarbon Space Velocity 0.35 v./hr./v., catalyst 4.2% copper on activated carbon, hydrogen gas flow rate 0.7 s.c.f./hr., hydrogen/epoxide mole ratio 1.5. The same catalyst was used in all of the experiments reported below in the table and the reactor volume was 207 cc. The catalyst was prepared by impregnating activated carbon with copper nitrate solution, drying the catalyst at 120° C. for about 16 hours, and then reducing the catalyst in a hydrogen atmosphere at 430° C. for about 8 hours.

| Run No. | Total Pressure, P.s.i.g. | Volume percent Total Water Layer Products | Wt. percent Hexanone-2 in Product | Percent Select. to Hexanone-2 | Percent Conv. of 2,5-DMTHF | Total Vol./ of Feed/ Reactor/ Vol., (v./v.) |
| --- | --- | --- | --- | --- | --- | --- |
| 3 | 400 | ---- | 38.5 | 51.0 | 78.1 | 0.53 |
| 3 | 400 | 9.0 | 41.1 | 52.4 | 79.6 | 0.82 |
| 4 | 200 | 4.6 | 36.9 | 60.4 | 61.4 | 1.25 |
| 4 | 200 | ---- | 46.9 | 68.7 | 68.3 | 1.51 |
| 5 | 200 | 4.6 | 36.9 | 54.3 | 68.0 | 2.27 |
| 5 | 200 | 4.6 | 37.5 | 55.3 | 67.8 | 2.65 |
| 6 | 100 | ---- | 36.4 | 57.8 | 63.0 | 3.36 |
| 6 | 100 | 2.8 | 35.9 | 65.4 | 54.9 | 3.75 |
| 7 | 50 | 0.8 | 24.8 | 53.1 | 46.7 | 4.45 |
| 7 | 50 | ---- | 24.9 | 61.4 | 42.4 | 4.85 |
| 8 | 150 | 1.9 | 23.1 | 64.2 | 36.0 | 5.10 |
| 8 | 150 | 1.3 | 24.3 | 53.2 | 45.7 | 5.20 |
| 9 | 150 | ---- | 24.4 | 49.6 | 49.2 | 5.76 |
| 10 | 0 | ---- | 8.5 | 20.5 | 41.4 | 6.30 |
| 10* | 0 | 0.5 | 12.9 | 27.0 | 47.6 | 6.96 |
| 11* | 0 | 0.3 | 9.1 | 19.9 | 45.9 | 7.47 |

*No hydrogen was passed over the catalyst in these runs.

It should be noted that although the same catalyst was used consecutively in all the runs that it was not deactivated sufficiently to disturb the showing of the optimum selectivity and activity obtained by operating at either 100, 150, or 200 p.s.i.g.

*Example 2*

Similar data were obtained using the same catalyst and reaction conditions except that no hydrogen was used in the process and the space velocity was 0.2 v./hr./v. These data are shown in FIGURE 1 wherein the total amount of feed passed over the catalyst is plotted against wt. percent conversion of 2,5-dimethyl tetrahydrofuran and also against the selectivity of conversion to 2-hexanone. From comparison of all the above data it can be seen that greatly improved catalyst life, activity and selective conversion to the desired ketones are obtained by operating with hydrogen in the range of 150-350 p.s.i.g. preferably 200-300 p.s.i.g.

What is claimed is:

1. A process for the preparation of ketones which comprises contacting a member of the group consisting of 2,3-epoxy butane and saturated epoxides of 5-16 carbon atoms having the epoxide oxygen joined to at least one secondary carbon atom corresponding to the formula

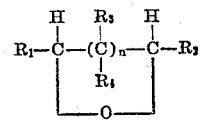

wherein $R_1$ and $R_2$ are selected from the group consisting of alkyl groups of 1 to 4 carbon atoms, hydrogen atoms, and alkyl groups joined together to form a single polymethylene bridge of 3 to 4 carbon atoms, $R_3$ and $R_4$ are selected from the group consisting of hydrogen atoms and alkyl groups of 1 to 4 carbon atoms; and $n$ is 0 to 3; at an isomerization temperature of about 200-500° C.

at a pressure of 150–350 p.s.i.g. in the presence of hydrogen supplied at 0.5–6.0 hydrogen-epoxide mol. ratio with a copper on an activated carbon support catalyst.

2. The process of claim 1 in which the catalyst prior to use is washed with a dilute basic solution to neutralize any residual acidity of the catalyst.

3. The process of claim 1 in which the catalyst is one prepared by impregnating an activated carbon support with a copper salt, drying, calcining at a temperature of 400–450° C. in a vacuum and reducing at these temperatures with hydrogen.

4. A process for the preparation of ketones which comprises contacting a member of the group consisting of 2,3-epoxy butane and saturated epoxides of 5–16 carbon atoms having the epoxide oxygen joined to at least one secondary carbon atom corresponding to the formula

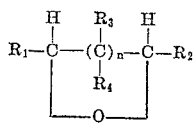

wherein $R_1$ and $R_2$ are selected from the group consisting of alkyl groups of 1 to 4 carbon atoms, hydrogen atoms, and alkyl groups joined together to form a single polymethylene bridge of 3 to 4 carbon atoms, $R_3$ and $R_4$ are selected from the group consisting of hydrogen atoms and alkyl groups of 1 to 4 carbon atoms; and $n$ is 0 to 3; at an isomerization temperature of about 200–500° C. at a pressure of 200–300 p.s.i.g. in the presence of hydrogen supplied at 0.5–6.0 hydrogen/epoxide mol. ratio with a copper on an activated carbon support catalyst.

5. A process for the preparation of ketones which comprises contacting a member of the group consisting of 2,3-epoxy butane and saturated epoxides of 5–16 carbon atoms having the epoxide oxygen joined to at least one secondary carbon atom corresponding to the formula

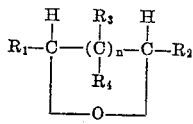

wherein $R_1$ and $R_2$ are selected from the group consisting of alkyl groups of 1 to 4 carbon atoms, hydrogen atoms, and alkyl groups joined together to form a single polymethylene bridge of 3 to 4 carbon atoms, $R_3$ and $R_4$ are selected from the group consisting of hydrogen atoms and alkyl groups of 1 to 4 carbon atoms; and $n$ is 0 to 3; at an isomerization temperature of about 200–500° C. at a pressure of 200–350 p.s.i.g. in the presence of hydrogen supplied at 1 to 2 hydrogen/epoxide mol. ratio with a copper on an activated carbon support catalyst.

6. A process for the preparation of ketones which comprises contacting a member of the group consisting of 2,3-epoxy butane and saturated epoxides of 5–16 carbon atoms having the epoxide oxygen joined to at least one secondary carbon atom corresponding to the formula

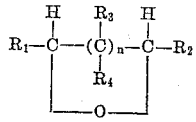

wherein $R_1$ and $R_2$ are selected from the group consisting of alkyl groups of 1 to 4 carbon atoms, hydrogen atoms, and alkyl groups joined together to form a single polymethylene bridge of 3 to 4 carbon atoms, $R_3$ and $R_4$ are selected from the group consisting of hydrogen atoms and alkyl groups of 1 to 4 carbon atoms; and $n$ is 0 to 3; at an isomerization temperature of about 200–500° C. at a pressure of 200–300 p.s.i.g. in the presence of hydrogen supplied at 1 to 2 hydrogen/epoxide mol. ratio with a catalyst comprising about 1–10% copper on an activated carbon support.

7. A process for the preparation of ketones according to claim 6 in which the epoxide is a tetrahydrofuran.

8. A process for the preparation of ketones according to claim 6 in which the epoxide is a tetrahydropyran.

9. A process for the preparation of 2-hexanone which comprises contacting 2,5-dimethyl tetrahydrofuran with 1 to 2 moles of hydrogen per mole of 2,5-dimethyl tetrahydrofuran at an isomerization temperature of about 200–500° C. and a pressure of 200–300 p.s.i.g. in the presence of a catalyst comprising about 1 to 10 wt. percent on an activated carbon support.

References Cited in the file of this patent

UNITED STATES PATENTS

| 2,537,813 | Bremner et al. | Jan. 9, 1951 |
| 2,799,708 | Oakley et al. | July 16, 1957 |

FOREIGN PATENTS

| 496,264 | Great Britain | Nov. 25, 1938 |

UNITED STATES PATENT OFFICE
CERTIFICATE OF CORRECTION

Patent No. 3,009,959                          November 21, 1961

Carl E. Heath et al.

It is hereby certified that error appears in the above numbered patent requiring correction and that the said Letters Patent should read as corrected below.

Column 6, line 36, after "percent" insert -- copper --.

Signed and sealed this 17th day of April 1962.

(SEAL)
Attest:

ESTON G. JOHNSON                         DAVID L. LADD

Attesting Officer                            Commissioner of Patents